US011323239B2

(12) United States Patent
Seward, IV

(10) Patent No.: US 11,323,239 B2
(45) Date of Patent: *May 3, 2022

(54) COUNTERMEASURE FOR POWER INJECTION SECURITY ATTACK

(71) Applicant: Silicon Laboratories Inc., Austin, TX (US)

(72) Inventor: Dewitt Clinton Seward, IV, Arlington, MA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,328

(22) Filed: Aug. 20, 2020

(65) Prior Publication Data

US 2020/0382272 A1 Dec. 3, 2020

Related U.S. Application Data

(63) Continuation of application No. 16/044,727, filed on Jul. 25, 2018, now Pat. No. 10,785,016.

(51) Int. Cl.
*G06F 12/14* (2006.01)
*H04L 9/00* (2022.01)
*G05F 1/625* (2006.01)

(52) U.S. Cl.
CPC .............. *H04L 9/003* (2013.01); *G05F 1/625* (2013.01)

(58) Field of Classification Search
CPC ... H04L 9/002–005; H04L 9/08; G06F 21/55; G06F 21/556; G06F 21/76
USPC ........................................................ 713/189
See application file for complete search history.

(56) References Cited

U.S. PATENT DOCUMENTS

| 4,623,950 A | 11/1986 | Palara et al. |
| 8,879,724 B2 | 11/2014 | Kocher et al. |
| 10,474,846 B1* | 11/2019 | Rezayee .................. G06F 1/28 |
| 10,785,016 B2 | 9/2020 | Seward |
| 2007/0076864 A1* | 4/2007 | Hwang ................. H04L 9/0625 380/29 |

(Continued)

OTHER PUBLICATIONS

Polian et al, Fault-based Attacks on Cryptographic Hardware, Apr. 1, 2013, IEEE, pp. 12-17. (Year: 2013).*

(Continued)

*Primary Examiner* — Luu T Pham
*Assistant Examiner* — Jenise E Jackson
(74) *Attorney, Agent, or Firm* — Nields, Lemack & Frame, LLC

(57) ABSTRACT

A system and method for determining whether a cryptographic system is being observed for power consumption analysis in an attempt to decipher secret keys. The system comprises a first external connection to receive an input voltage, an internal voltage regulator with an external capacitor to produce the desired voltage for the cryptographic system. The internal voltage regulator typically includes a switch that passes current from the first external connection to the external capacitor. By monitoring the frequency at which the switch is activated, it is possible to detect that an external voltage is being applied to the external capacitor. This external voltage is typically used to perform SPA or DPA operations. Thus, the cryptographic system may cease performing any encryption or decryption operations if an external voltage is detected.

17 Claims, 3 Drawing Sheets

(56) References Cited

U.S. PATENT DOCUMENTS

| | | |
|---|---|---|
| 2007/0076890 A1 | 4/2007 | Muresan et al. |
| 2008/0211561 A1 | 9/2008 | Kurokawa et al. |
| 2009/0066293 A1* | 3/2009 | Miyanaga ........ G01R 19/16538 |
| | | 320/134 |
| 2009/0146267 A1 | 6/2009 | Peytavy et al. |
| 2010/0265743 A1* | 10/2010 | Joshi ................ H02M 3/33515 |
| | | 363/84 |
| 2014/0354341 A1 | 12/2014 | Carmon |
| 2016/0164513 A1* | 6/2016 | Ham ................... H03K 17/223 |
| | | 327/536 |
| 2016/0259390 A1 | 9/2016 | Tomas et al. |
| 2016/0352508 A1 | 12/2016 | Guillen-Hernandez et al. |
| 2016/0359476 A1* | 12/2016 | Yu ............................ H03K 5/26 |
| 2016/0373264 A1 | 12/2016 | Katoh |
| 2018/0007074 A1 | 1/2018 | Kune et al. |
| 2020/0036509 A1 | 1/2020 | Seward |
| 2020/0393886 A1* | 12/2020 | Jeanne ............... H04N 21/4436 |

OTHER PUBLICATIONS

Shao et al, Automatic Security Enhancement of Crypto ICs Against Fault Injection Attacks, Sep. 23, 2016, IEEE, pp. 11-15. (Year: 2016).*

Gruber et al., An Ultra-Low Power Voltage Regulator for Wireless Sensor Nodes, 2009, IEEE, pp. 1-4.

Lackey et al., Managing Power and Performance for System-On-Chip Designs Using Voltage Islands, 2002, IEEE, pp. 195-202.

Office action dated Feb. 18, 2020 in co-pending U.S. Appl. No. 16/044,727.

Notice of allowance dated Jul. 9, 2020 in co-pending U.S. Appl. No. 16/044,727.

* cited by examiner

COUNTERMEASURE FOR POWER INJECTION SECURITY ATTACK

This application is a continuation of U.S. patent application Ser. No. 16/044,727 filed Jul. 25, 2018, the disclosure of which is incorporated herein by reference in its entirety.

FIELD

This disclosure describes systems and methods for detecting and protecting against a power injection security attack.

BACKGROUND

Encryption is now used for a plurality of applications, such as password protection for wireless networks, smart cards, and others. Various algorithms are used to provide this encryption. Most involve the use of a secret key, which may be 128 bits or more. Messages, which may be referred to as plaintext, are encoded by the source using the secret key, and transmitted to a destination. The destination then uses the same secret key to decrypt the message sent by the source.

Since the secret key has 128 bits, the possibility of breaking the secret key using a brute force attack is small. However, recently, side-channel attacks have become more prevalent. A side-channel is a characteristic of the system that unintentionally provides information concerning the secret key. For example, one example of a side-channel is power consumption.

Encryption and decryption algorithms involve various software and/or hardware procedures. Each of these software and/or hardware procedures may typically use a different amount of power. Thus, by monitoring the power consumption of a cryptographic system, it may be possible to deduce the progression of the encryption and decryption algorithms.

In fact, by only monitoring the power consumption of a cryptographic system, it has been demonstrated that it is possible to decipher secret keys from a wide variety of different cryptographic algorithms, such as Advanced Encryption Standard (AES). Techniques used to decipher these secret keys may include simple power analysis (SPA), differential power analysis (DPA), and high order differential power analysis (HO-DPA).

Attempts at countermeasures have been developed. These include generating random noise within the cryptographic system to make power consumption analysis more difficult. In other words, these countermeasures seek to affect power consumption all of the time.

However, these countermeasures do not attempt to determine when a power consumption analysis attack is occurring. Therefore, it would be beneficial if there were a system and method that could detect when the cryptographic system was being observed for power consumption analysis. In response to this, the cryptographic system may opt to take defensive actions, such as to not to perform any cryptography operations.

SUMMARY

A system and method for determining whether a cryptographic system is being observed for power consumption analysis in an attempt to decipher secret keys. The system comprises a first external connection to receive an input voltage, an internal voltage regulator with an external capacitor to produce the desired voltage for the cryptographic system. The internal voltage regulator typically includes a switch that passes current from the first external connection to the external capacitor. By monitoring the frequency at which the switch is activated, it is possible to detect that an external voltage is being applied to the external capacitor. This external voltage is typically used to perform SPA or DPA operations. Thus, the cryptographic system may opt to take defensive actions, such as to cease performing any encryption or decryption operations if an external voltage is detected.

According to one embodiment, an electronic component is disclosed. The electronic component comprises a first external connection to receive an input voltage; a second external connection, maintained at an operating voltage; an internal voltage regulator, in communication with the first external connection and the second external connection, comprising an internal switching component in communication with the first external connection and the second external connection to supply current from the input voltage to the second external connection to maintain the second external connection at the operating voltage, wherein the internal switching component is controlled by a signal from the internal voltage regulator; a monitoring circuit in communication with the signal; and a cryptographic system; wherein the monitoring circuit determines whether power consumption analysis is being performed at the second external connection based on activity of the signal and behavior of the cryptographic system is modified if power consumption analysis is being performed. In certain embodiments, the monitoring circuit monitors a frequency of the signal. In other embodiments, the monitoring circuit monitors a duration of an inactive period of the signal. In other embodiments, the monitoring circuit monitors an amount of time that the signal is active. In certain embodiments, the cryptographic system is disabled if power consumption analysis is being performed.

According to another embodiment, an electronic component is disclosed. The electronic component comprises a first external connection to receive an input voltage; a second external connection, maintained at an operating voltage; an internal voltage regulator, in communication with the first external connection and the second external connection, comprising an internal switching component in communication with the first external connection and the second external connection to supply current from the input voltage to the second external connection to maintain the second external connection at the operating voltage, wherein the internal switching component is controlled by a signal from the internal voltage regulator; a monitoring circuit in communication with the signal; a cryptographic system; and a processing unit, wherein the monitoring circuit alerts the processing unit if power consumption analysis is being performed. In certain embodiments, the monitoring circuit causes an interrupt to the processing unit. In certain embodiments, the monitoring circuit causes a bit in a register, readable by the processing unit, to be modified. In some embodiments, the processing unit modifies an operation of the cryptographic system if power consumption analysis is being performed.

According to another embodiment, an electronic component is disclosed. The electronic component comprises a first external connection to receive an input voltage; a second external connection, maintained at an operating voltage; an internal voltage regulator, in communication with the first external connection and the second external connection, comprising an internal switching component in communication with the first external connection and the second external connection to supply current from the input voltage to the second external connection to maintain the second external connection at the operating voltage, wherein the internal switching component is controlled by a signal from the internal voltage regulator; a monitoring circuit in communication with the signal, wherein the monitoring circuit determines whether power consumption analysis is being performed at the second external connection based on activity of the signal; a cryptographic system; and a Secure Element in communication with the monitoring circuit. In certain embodiments, the Secure Element undertakes countermeasures if power consumption analysis is being performed. In certain embodiments, the Secure Element disables the cryptographic system, deletes all encryption keys stored in the electronic component, replaces all encryption keys stored in the electronic component with random values, or resets the electronic component if power consumption analysis is being performed.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
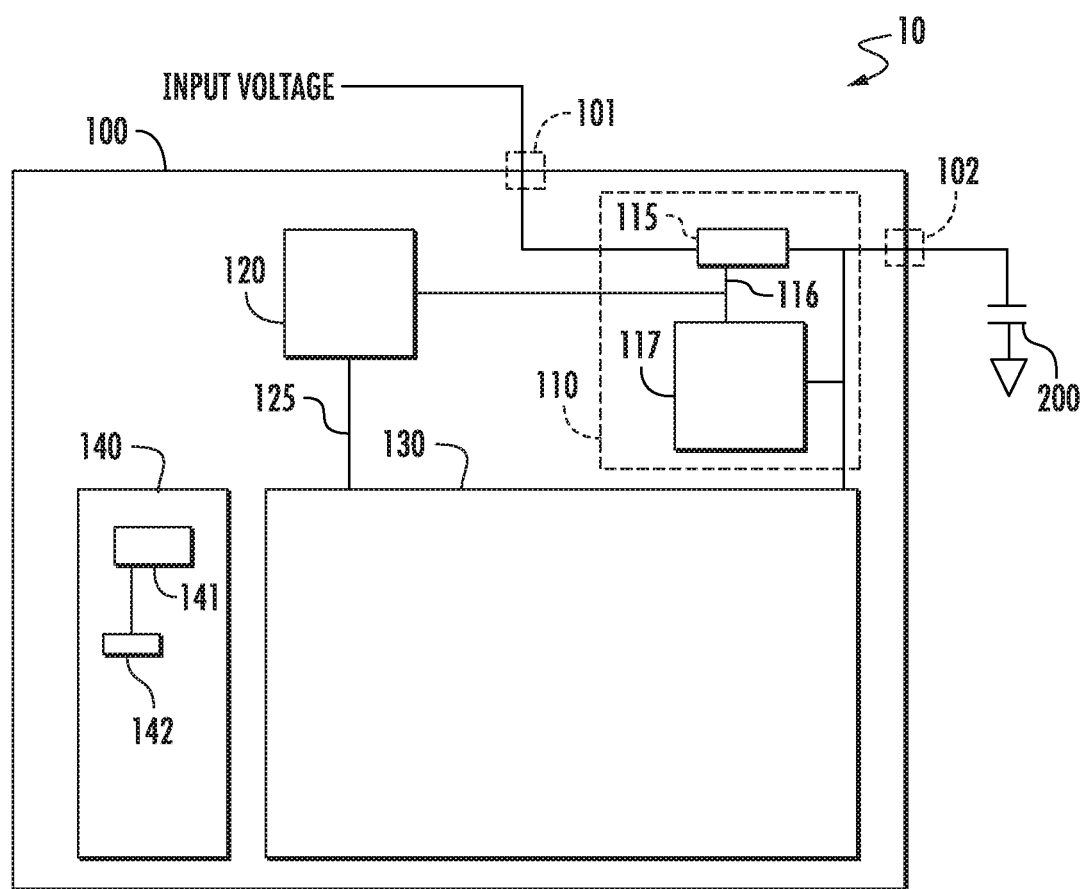
FIG. 1 is a block diagram of a representative system according to one embodiment.

FIG. 1 shows a block diagram of a representative system 10 that includes countermeasures to prevent power consumption analysis to be performed on a cryptographic system. The system includes an electronic component 100. The electronic component 100 has a first external connection 101 and a second external connection 102. In this disclosure, the term "external connection" is used to represent an input or output to the electronic component. In certain embodiment, the electronic component may be enclosed in a package which has a plurality of physical pins that attach to a substrate, such as a printed circuit board. In other embodiments, the electronic component 100 may be enclosed within a package that comprises a plurality of bumps or contact regions. Thus, the term "external connection" denotes any external interface that allows the electronic component 100 to interface with other components. Within the electronic component 100 is an internal voltage regulator 110, a monitoring circuit 120 and a cryptographic system 130. Other digital circuitry 140 may also be included within the electronic component 100. This digital circuitry 140 may or may not be powered from the same operating voltage as the cryptographic system 130.

As mentioned above, power consumption analysis may be used to attempt to decipher secret keys. A voltage source, which allows the measurement of current, is used to power the cryptographic system. By multiplying the instantaneous current measurements by the voltage, the power consumed by the cryptographic system as a function of time can be calculated. By monitoring power consumption while supplying data to the cryptographic system, one may be able to decipher the secret key.

Looking at FIG. 1, the voltage source is typically injected at second external connection 102 of electronic component 100. This second external connection 102 is used to supply the power to the cryptographic system 130 of the electronic component 100. Optionally, this second external connection may also provide power to the other portions of the electronic component 100.

The electronic component 100 may have a first external connection 101 which accepts an input voltage, which is typically greater than the desired operating voltage. The electronic component 100 also has an internal voltage regulator 110, which creates the operating voltage based on the input voltage. The internal voltage regulator 110 comprises a switching component 115, such as a transistor, which allows current from the first external connection 101 to pass to the second external connection 102 and the external capacitor 200. The switching component 115 is controlled by the power supply controller 117. The power supply controller 117 may be a collection of amplifiers, comparators, and discrete components. In other embodiments, the power supply controller 117 may also include some digital circuitry, such as a processing unit. In all of these embodiments, the power supply controller 117 has an output signal 116 that is in communication with the switching component 115. This output signal 116 is used to control the flow of current from the first external connection 101 to the second external connection 102. In other words, when the output signal 116 is asserted, current flows from the first external connection 101 to the second external connection 102. The internal voltage regulator 110 may be in communication with the first external connection 101 and the second external connection 102.

Attached to second external connection 102 may be an external capacitor 200. An external capacitor is used to store charge needed by the electronic component 100. Due to the amount of capacitance needed for this storage, the capacitor typically must be placed outside the electronic component 100 and cannot be integrated into the electronic component 100.

As noted above, when power consumption analysis is performed, the voltage is typically injected at second external connection 102. In this way, the external voltage source is readily able to measure both voltage and current.

When a voltage is injected on second external connection 102, the power supply controller 117 will detect that the voltage at second external connection 102 is greater than the desired operating voltage. Consequently, it will not assert output signal 116, as there is no need for current to flow from the first external connection 101 to the external capacitor 200.

Alternatively, when voltage is not being injected on second external connection 102, the power supply controller 117 will be asserting and deasserting the output signal 116 regularly to insure that sufficient current is passed to the external capacitor 200.

Thus, the output signal 116 provides an indication of whether an external voltage is being applied to the second external connection 102. This is indicative that power consumption analysis is being performed. Using this information, it is possible to devise actions that prevent the secret key from being deciphered.

The output signal 116 may be used in a variety of ways. The output signal 116 may be in communication with a monitoring circuit 120. In one embodiment, the monitoring circuit 120 detects the number of transitions of the output signal 116 over a predetermined amount of time. As stated above, when the cryptographic system 130 is operating, it may use large amounts of power. This will require charge to be continuously replenished to the external capacitor 200. This is done by asserting the output signal 116. When the external capacitor 200 is sufficiently charged, the output signal 116 is deasserted. By counting the number of assertions (i.e. positive transitions), the number of deassertions (i.e. negative transitions) or the total number of transitions over a predetermined period of time, the monitoring circuit 120 can determine whether voltage is being injected at second external connection 102.

Figure 2:
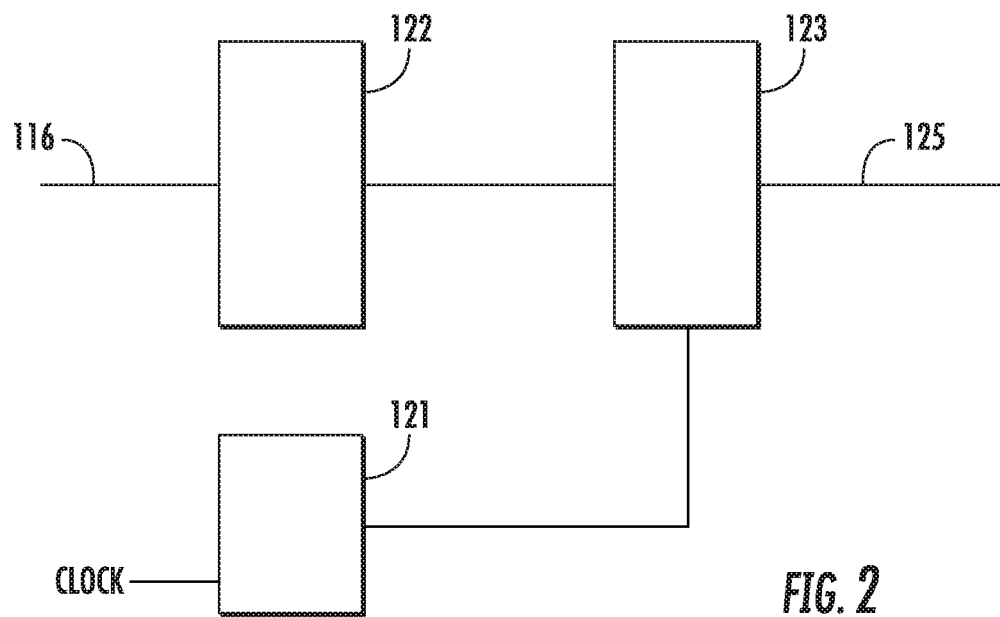
FIG. 2 shows a block diagram of a monitoring circuit according to a first embodiment.

For example, as shown in FIG. 2, the monitoring circuit 120 may have a timer 121 and a counter 122. The output signal 116 is used to increment the counter 122. As stated above, the counter 122 may increment based on positive transitions, negative transitions or both. While the counter 122 is being controlled in this manner, the timer 121 is used to time a predetermined period of time. After the expiration of the timer 121, the value of the counter 122 is compared to a predetermined value using comparator 123. It may be assumed that under normal operating conditions, the output signal 116 may transition at least a predetermined number of times. If the value of the counter 122 is less than this predetermined value, it may be determined that power injection is occurring, as indicated by signal 125. After the expiration of the timer 121, the counter 122 may be reset so that the process can be repeated. This process may be repeated continuously in certain embodiments. In other embodiments, this process may only be enabled when the cryptographic system 130 is executing encryption or decryption operations.

Figure 3:
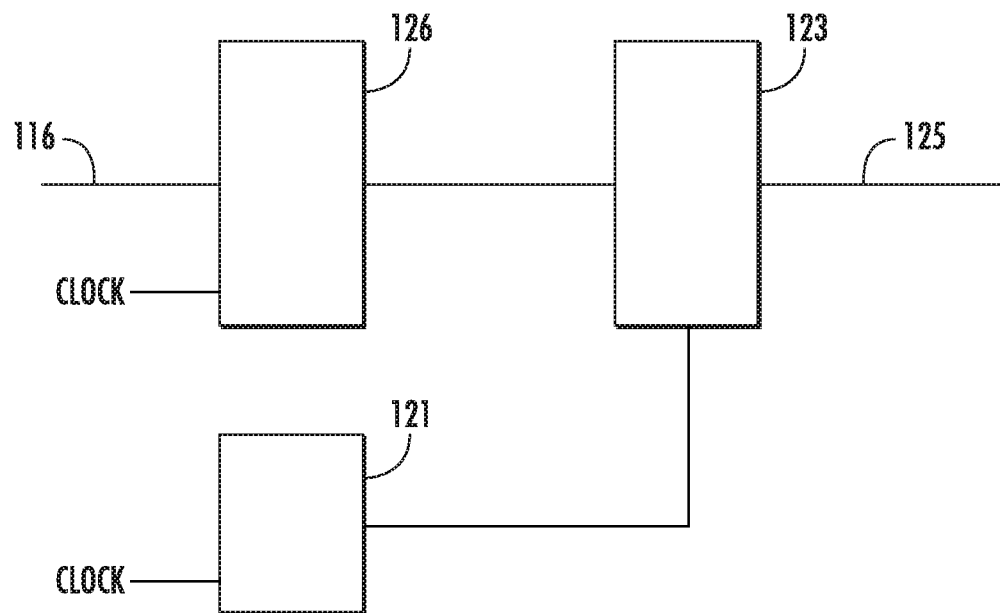
FIG. 3 shows a block diagram of a monitoring circuit according to a second embodiment.

FIG. 3 shows another embodiment of the monitoring circuit 120. In this embodiment, a timer 121 and a counter 126 are used. In this embodiment, the counter 126 is clocked at a fixed frequency, but is only incremented when the output signal 116 is asserted. This gives an indication of the amount of time that current is being passed from the first external connection 101 to the external capacitor 200. As in the embodiment of FIG. 2, the timer 121 is used to time a predetermined period of time. After the expiration of the timer 121, the value of the counter 126 is compared to a predetermined value using comparator 123. It may be assumed that under normal operating conditions, the output signal 116 may be asserted at least a predetermined percentage of the time. If the value of the counter 124 is less than this predetermined value, it may be determined that power injection is occurring, as indicated by signal 125. After the expiration of the timer 121, the counter 126 may be reset so that the process can be repeated. This process may be repeated continuously in certain embodiments. In other embodiments, this process may only be enabled when the cryptographic system 130 is executing encryption or decryption operations.

Figure 4:
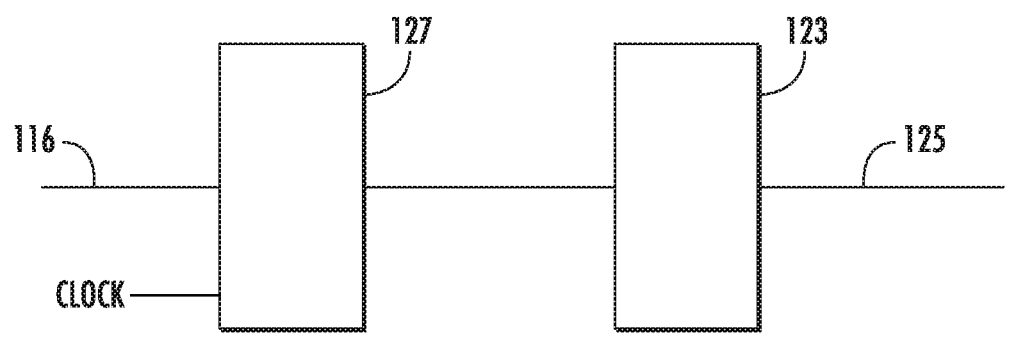
FIG. 4 shows a block diagram of a monitoring circuit according to a third embodiment.

FIG. 4 shows another embodiment of the monitoring circuit 120. In this embodiment, the duration of the inactive period of the output signal 116 is measured. In this embodiment, a counter 127 is clocked at a fixed frequency and is incremented whenever the output signal 116 is inactive or deasserted. The assertion of the output signal 116 resets the counter. In other words, the value of the counter is indicative of the duration of time that the output signal 116 has been deasserted and no current is flowing from the first external connection 101 to the external capacitor 200. The output of counter 127 is continuously compared to a predetermined value, using comparator 123. It may be assumed that under normal operating conditions, the output signal 116 is not deasserted longer than a predetermined amount of the time. If the value of the counter 127 exceeds this predetermined value, it is determined that power is being injected at second external connection 102, as indicated by signal 125. This process may be repeated continuously in certain embodiments. In other embodiments, this process may only be enabled when the cryptographic system 130 is executing encryption or decryption operations.

Returning to FIG. 1, the signal 125 from the monitoring circuit 120 is then used by the cryptographic system 130. In one embodiment, the cryptographic system 130 may use the signal 125 to serve as an enable signal. In other words, if the monitoring circuit 120 determines that power injection is occurring, the cryptographic system 130 may no longer perform any encryption or decryption operations. The function of other portions of the electronic component 100, such as the digital circuitry 140, may not be affected by signal 125.

In another embodiment, the function of the cryptographic system 130 may change based on signal 125. For example, more compute intensive countermeasures may be undertaken by the cryptographic system 130.

In another embodiment, the signal 125 may be made accessible to a processing unit. The processing unit may be an embedded processor, such as an ARM-based microprocessor. The processing unit may also be a microcontroller or a custom design. In one embodiment, the processing unit 141 may be disposed within the digital circuitry 140. In other embodiments, the processing unit 141 may be disposed within the cryptographic system 130. The signal 125 may be used to cause an interrupt to the processing unit 141. This allows real time detection of the power injection by the processing unit 141, and allows immediate remedial actions to be taken by the processing unit 141. In other embodiments, the signal 125 may be made accessible to the processing unit 141 using another mechanism, such as through modification of a bit in a register 142.

Thus, in these embodiments, the operation of the cryptographic system 130 is modified, either directly or indirectly, based on the signal 125. In some embodiments, the modification is a disablement of the encryption and decryption operations. In other embodiments, the modification may be a change in the computation of the cryptographic system 130, such as the use of more compute intensive countermeasures. In all of these embodiments, the signal 125 causes the initiation of these countermeasures.

Figure 5:
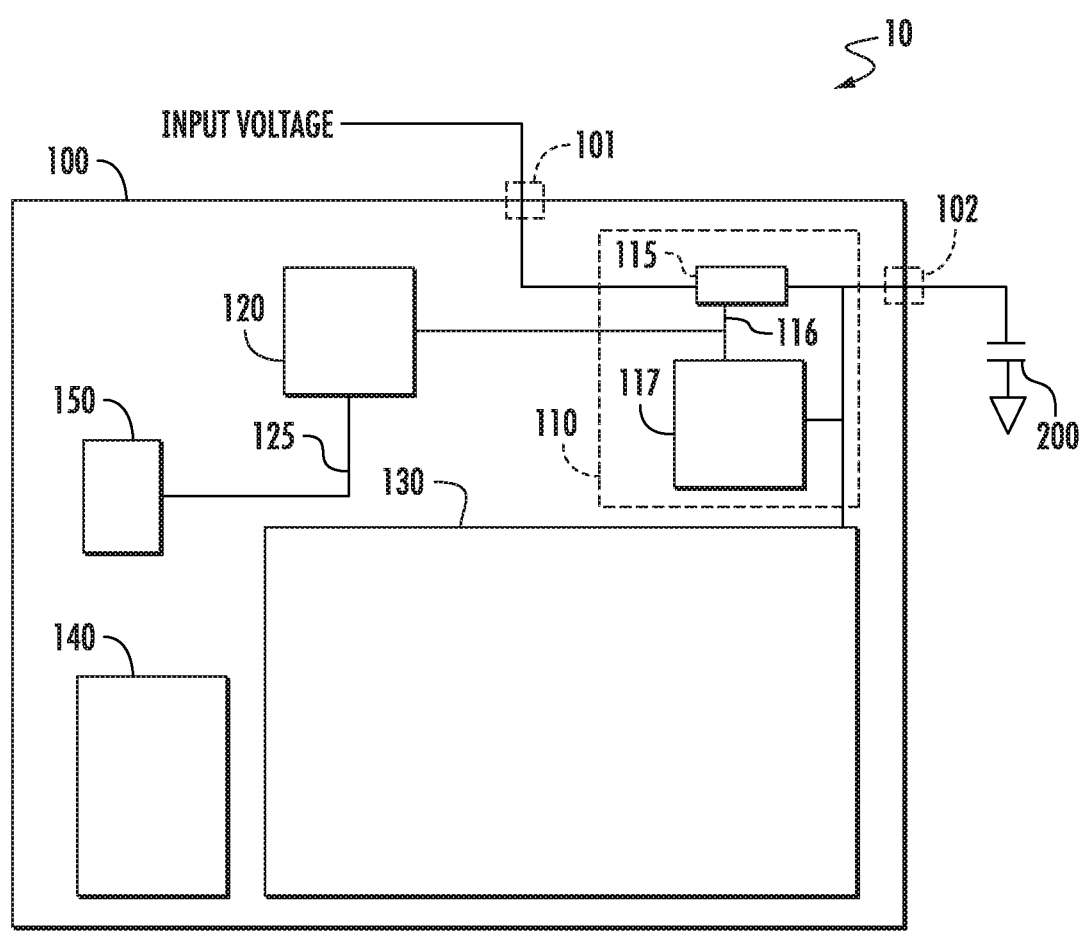
FIG. 5 is a block diagram of a representative system according to another embodiment.

In another embodiment, shown in FIG. 5, the electronic component 100 may include a Secure Element 150. A Secure Element is defined as a tamper-resistant platform capable of securely hosting applications and their confidential and cryptographic data in accordance with the rules and security requirements set forth by a set of well-identified trusted authorities. The Secure Element 150 is typically a one chip secure microcontroller, or it could be integrated into the main chip as a separate peripheral. In this embodiment, the signal 125 may serve as an input to the Secure Element 150. In response to a change in signal 125, the Secure Element 150 may undertake countermeasures. In certain embodiments, the Secure Element 150 may decide to enable/disable the cryptographic hardware in the chip. In other embodiments, the Secure Element 150 may decide to erase all keys, or replace keys with random values, or reset the electronic component 100, or otherwise render the whole system inoperable to prevent further attack.

In summary, the present disclosure describes a system for determining that a power consumption analysis is being performed by monitoring the operation of an internal voltage regulator 110. If the operation of the internal voltage regulator 110 is inconsistent with typical or normal operation, the monitoring circuit 120 may determine that voltage is being injected at the second external connection 102. This determination may be made by monitoring an output signal 116 that controls a switching component 115 which passes current from the first external connection 101 to the external capacitor 200. Once this determination is made, the system may invoke countermeasures. These countermeasures include the disabling of encryption and decryption operations, or other measures.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An electronic component, comprising:
   a first external connection to receive an input voltage;
   a second external connection, maintained at an operating voltage;
   an internal voltage regulator, in communication with the first external connection and the second external connection, comprising an internal switching component in communication with the first external connection and the second external connection to supply current from the first external connection to the second external connection to maintain the second external connection at the operating voltage, wherein the internal switching component is controlled by a signal from the internal voltage regulator, wherein the signal consists of two states:
   an asserted stated wherein current flows from the first external connection to the second external connection; and
   a deasserted state wherein the current does not flow; and
   wherein the monitoring circuit monitors the current passing through the internal switching component based on the signal;
   a monitoring circuit in communication with the internal voltage regulator; and
   a cryptographic system;
   wherein the monitoring circuit determines whether power is being injected at the second external connection based on the current passing through the internal switching component from the first external connection to the second external connection and an operation of the cryptographic system is modified if power is being injected at the second external connection.

2. The electronic component of claim 1, wherein the monitoring circuit monitors a frequency of the signal.

3. The electronic component of claim 1, wherein the monitoring circuit monitors a duration of an inactive period of the signal.

4. The electronic component of claim 1, wherein the monitoring circuit monitors an amount of time that the signal is active.

5. The electronic component of claim 1, wherein the cryptographic system is disabled if power is being injected at the second external connection.

6. An electronic component, comprising:
   a first external connection to receive an input voltage;
   a second external connection, maintained at an operating voltage;
   an internal voltage regulator, in communication with the first external connection and the second external connection, comprising an internal switching component in communication with the first external connection and the second external connection to supply current from the first external connection to the second external connection to maintain the second external connection at the operating voltage, wherein the internal switching component is controlled by a signal from the internal voltage regulator, wherein the signal consists of two states:
   an asserted stated wherein current flows from the first external connection to the second external connection; and
   a deasserted state wherein the current does not flow; and
   wherein the monitoring circuit monitors the current passing through the internal switching component based on the signal;
   a monitoring circuit in communication with the internal voltage regulator, wherein the monitoring circuit determines whether power is being injected at the second external connection based on the current passing through the internal switching component from the first external connection to the second external connection;
   a cryptographic system; and
   a processing unit, wherein the monitoring circuit alerts the processing unit if power is being injected at the second external connection and the processing unit modifies an operation of the cryptographic system if power is being injected at the second external connection.

7. The electronic component of claim 6, wherein the monitoring circuit causes an interrupt to the processing unit.

8. The electronic component of claim 6, wherein the monitoring circuit causes a bit in a register, readable by the processing unit, to be modified.

9. The electronic component of claim 6, wherein the monitoring circuit monitors a frequency of the signal.

10. The electronic component of claim 6, wherein the monitoring circuit monitors a duration of an inactive period of the signal.

11. The electronic component of claim 6, wherein the monitoring circuit monitors an amount of time that the signal is active.

12. An electronic component, comprising:
    a first external connection to receive an input voltage;
    a second external connection, maintained at an operating voltage;
    an internal voltage regulator, in communication with the first external connection and the second external connection, comprising an internal switching component in communication with the first external connection and the second external connection to supply current from the first external connection to the second external connection to maintain the second external connection at the operating voltage, wherein the internal switching component is controlled by a signal from the internal voltage regulator, wherein the signal consists of two states:
an asserted stated wherein current flows from the first external connection to the second external connection; and
a deasserted state wherein the current does not flow; and wherein the monitoring circuit monitors the current passing through the internal switching component based on the signal;
a monitoring circuit in communication with the internal voltage regulator, wherein the monitoring circuit determines whether power is being injected at the second external connection based on current passing through the internal switching component from the first external connection to the second external connection;
a cryptographic system; and
a Secure Element in communication with the monitoring circuit, wherein a Secure Element is defined as a tamper-resistant platform capable of securely hosting applications and their confidential and cryptographic data in accordance with the rules and security requirements set forth by a set of well-identified trusted authorities, wherein the Secure Element modifies an operation of the cryptographic system if power is being injected at the second external connection.

13. The electronic component of claim 12, wherein the Secure Element undertakes countermeasures if power is being injected at the second external connection.

14. The electronic component of claim 13, wherein the Secure Element disables the cryptographic system if power is being injected at the second external connection.

15. The electronic component of claim 13, wherein the Secure Element deletes all encryption keys stored in the electronic component if power is being injected at the second external connection.

16. The electronic component of claim 13, wherein the Secure Element replaces all encryption keys stored in the electronic component with random values if power is being injected at the second external connection.

17. The electronic component of claim 13, wherein the Secure Element resets the electronic component if power is being injected at the second external connection.

* * * * *